United States Patent
Bauer et al.

[11] Patent Number: 5,816,769
[45] Date of Patent: Oct. 6, 1998

[54] FLEXIBLE MANIPULATOR

[75] Inventors: Jochen Bauer, Augsburg; Wendelin Feiten, Neubiberg, both of Germany

[73] Assignee: Siemens Aktiengesellschaft, Munich, Germany

[21] Appl. No.: 743,676

[22] Filed: Nov. 6, 1996

[30]      Foreign Application Priority Data

Nov. 7, 1995 [DE] Germany .................. 195 41 458.6

[51] Int. Cl.$^6$ .................................................. B25J 18/06
[52] U.S. Cl. .............................. 474/680; 901/21; 901/23; 901/28; 74/490.03; 74/490.04
[58] Field of Search ................... 414/680; 901/21, 901/23, 28, 29; 74/490.04, 490.03, 490.05

[56]              References Cited

U.S. PATENT DOCUMENTS

| | | |
|---|---|---|
| 3,266,059 | 8/1966 | Stelle . |
| 4,739,241 | 4/1988 | Vachtsevanos et al. ............. 901/29 X |
| 4,815,911 | 3/1989 | Bengtsson et al. .................... 901/21 X |
| 5,053,687 | 10/1991 | Merlet ................................... 901/21 X |
| 5,297,443 | 3/1994 | Wentz .................................... 901/21 X |
| 5,567,110 | 10/1996 | Sutherland ............................ 901/21 X |

FOREIGN PATENT DOCUMENTS 0 249 318  11/1989  European Pat. Off. .

Primary Examiner—Donald W. Underwood
Attorney, Agent, or Firm—Hill & Simpson

[57]              ABSTRACT

A flexible manipulator is constructed of parallel elements which are layered one over the other along a stacking axis and preferably have at least three bores on the circumference, which are aligned to form a guide arrangement. Projecting sleeves are provided at the bores and extend telescopically into one another from respectively two adjacent elements. Elastic rods are guided through the bores, which rods are fastened at one end of the manipulator and exit freely at the other. The manipulator can be brought into an arbitrary shape through the tension and pressure created by displacing of these rods in a particular manner. In addition, a blocking material is provided in the invention which can lock the sleeves of adjacent elements from movement so that a displacement of a rod will be directed between a different pair of elements. The locking or blocking of the movement of the sleeves can be obtained by utilizing the rotation of the actuating rods.

18 Claims, 3 Drawing Sheets

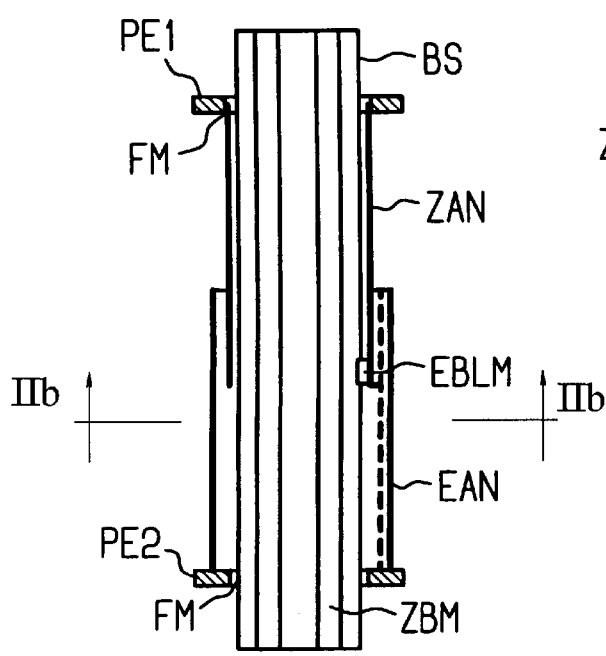
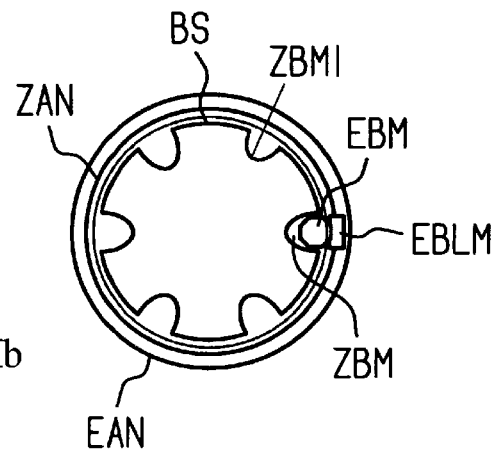
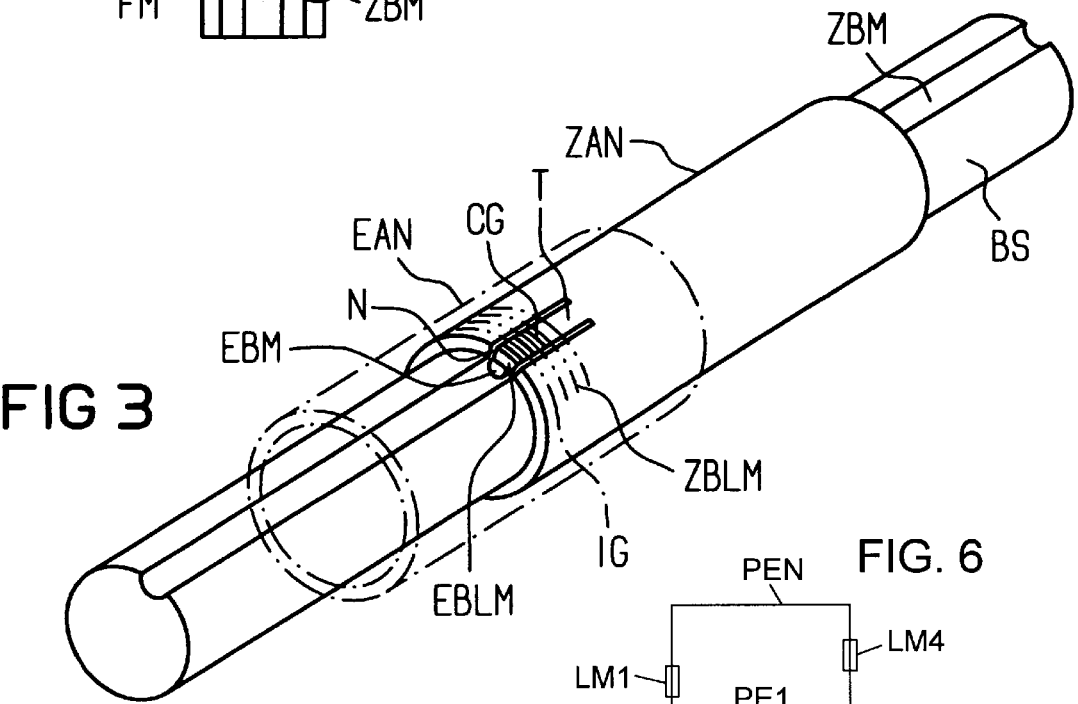
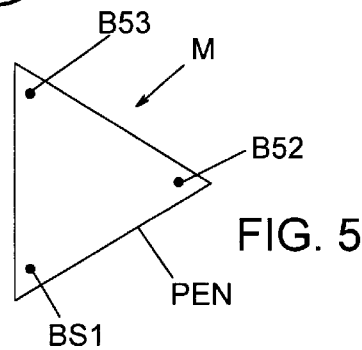
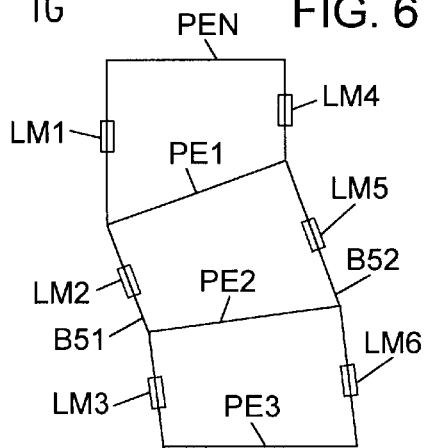

FLEXIBLE MANIPULATOR

BACKGROUND OF THE INVENTION

With increasing frequency, even complicated manipulations are being carried out by machines. In many cases, places that are inaccessible or dangerous for human beings must be reached by an actuator or manipulator. Examples of such manipulators include robot arms, which are used in industrial manufacturing, or microactuators used, for example, for grippers. Actuators or manipulators are also standardly used in surgical applications.

With the increasing technicalization of areas outside what are called high-tech environments, it appears desirable to have available manipulators that are inexpensive to manufacture and easy to control. A possible future area of use of such low-cost apparatus would be, for example, in a household appliance. However, the problem is that such manipulators must be of a simple construction so that they can be economically manufactured and operate in a failsafe manner.

Many versions of manipulators are known. For example, in U.S. Pat. No. 3,266,059, a helical spring is disclosed as the manipulator and comprises guide eyes distributed on its circumference. Steel cables are guided through these eyes and are fastened to one end of the spring. By pulling on these cables, which exit at the other end of the spring, the manipulator can be bent and set into motion.

SUMMARY OF THE INVENTION

An object of the present invention is to provide a flexible manipulator that is of a simple construction and whose exertable force can be predetermined in each of its directions of motion. The manipulator can be used in the fields of inexpensive household robots or cleaning devices.

This object is obtained by a flexible manipulator comprising at least two planar elements having essentially the same shape being arranged one above the other along a stacking axis extending substantially perpendicular to the flat plane of the elements so as to form a stack arrangement, connecting means being provided between the elements to connect the elements with one another, said connecting means essentially allowing only an axial mobility of the elements along the stacking axis away from one another and toward one another, as well as at an angled position of the elements to one another, guide means being uniformly distributed on the circumference of each of the elements to provide at least three sets of first axes extending parallel to the stacking axis and have essentially the same spacing from one another, a flexible elastic actuating rod being guided through each of the sets of guide means, said rod being fastened in an axially nondisplaceable manner to a first end of the stacked arrangement and exiting at a second end in a freely displaceable manner, and separate drive means acting on each of said rods for displacing the rod relative to the second end of the stack arrangement so that the guide means for the respective rod move closer together and farther apart, depending on the direction of displacement.

A particular advantage of the inventive manipulator is that, in comparison with the prior art manipulators, only one means is required, namely the elastic rods, in order to exert tension and pressure with the manipulator. In addition, the manipulator of this type of construction offers the great advantage of a higher rigidity in comparison with known embodiments and can, thus, also move larger loads than prior-known devices.

In the inventive manipulator, the individual planar elements can advantageously be connected with knee joints or toggle linkages, since these ensure a good guidance connection with a low weight. Expansion bellow tubes can also be provided between the planar elements in the inventive manipulator as the connecting means. Expansion bellow tubes have, as is known, a high torsion rigidity and are nonetheless very flexibly deformable.

Bores in the planar elements are advantageously used as guide means for the actuating rods, since the bores are technically simple to obtain and can, thus, be preferably used in a commercial product.

The individual planar elements advantageously can include telescopic extensions at their bores. These extensions are arranged to extend into one another and will ensure a higher guiding of the individual elements. It is inventively provided that the individual elements are able to be locked or blocked against one another to ensure that the flexible manipulator can be deliberately controlled in arbitrary directions of motion.

Preferably, only one of the two projections between the two planar elements of the inventive manipulator is provided with a blocking means, since this embodiment is particularly simple to realize. The blocking or locking process can be initiated by a simple clamping or wedging of the two projections against one another.

Advantageously, for the locking of the two projections between two planar elements of the inventive manipulator, two cooperating locking means are also used, if a further axial connection between the two planar elements is required. For example, these axial locking means can be realized in steps or in threads in which a wedge is engaged.

One of the two locking means preferably comprises an actuator means with which it can be actuated. Preferably, this actuator means is initiated by rotation, and the locking means that is actuated is elastically mounted so that after the locking means is relieved of stress, the actuating means returns to its initial position and releases the locking axial connection. In particular, it is advantageous for the actuating means of the individual locking means of different planar elements of the inventive actuator to be arranged so that their actuating means are initiated through rotation of the actuating rod.

It is particularly advantageous for the arrangement to be provided so that in different rotational positions of the actuating rod, respectively, only one actuating means of a blocking or locking means of an individual planar element pairing is released, whereby all the others are locked or blocked. By means of this very simple measure, it can be advantageously achieved that the different planar element pairings can be brought into a defined spacing to one another in relation to the respective actuating rod. In connection with the other actuating rods, a nearly arbitrary shape of the manipulator can be set in this way through the respective simple rotation and locking or, respectively, unlocking of the individual locking or blocking devices. A very precise positionability of the tip of the manipulator is thereby achieved with a very simple means. This arrangement can preferably be realized in that the actuating rod comprises longitudinal grooves of different depths, so that only one is deep enough that it, for example, releases a nipple provided as an actuating means on the locking means in only one position. In other rotational positions, the nipples are then, respectively, released at other element pairings.

Preferably, due to the simple technical construction, the drive of an actuating rod is realized in that the rod comprises an external threading on its exit end, and is drawn in and out by means of a sleeve that is also axially displaceable and is rotated. The actuating bar can be secured against rotation, for example, by means of a longitudinal control or guide in the form of a groove or metal rail.

In a particularly advantageous fashion, the longitudinal guide of the actuating rod is realized in such a way that it can be brought into defined rotational positions. Thus, on the one hand, a drive can be realized by means of the threaded sleeve solution and, on the other hand, the control of the respective actuation for the individual locking means can be technically realized.

Preferably, the threaded sleeve for the drive of a respective actuating rod is realized as an internal threading in a bore of a hollow motor drive shaft. In this way, it is possible to do without additional components for driving the actuator.

Preferably, the drive of the longitudinal guide means of the actuating rod can be realized, on the one hand, by a motor and by a suitable coupling means, but can also, on the other hand, be realized separately by means of known magnetic-actuated clinch or ratchet mechanisms.

Other advantages and features of the invention will be readily apparent from the following description of the preferred embodiments, the drawings and claims.

BRIEF DESCRIPTION OF THE DRAWINGS

FIG. 1b illustrating the manipulator in a curved or bent position and FIG. 1c showing a modification of the manipulator of FIG. 1a;

FIG. 2a is a longitudinal cross section with portions in elevation for purposes of illustration illustrating a blocking arrangement for adjacent planar elements;

FIG. 2b is a cross sectional view taken along the lines IIb—IIb of FIG. 2a;

FIG. 3 is a perspective view of first and second projections with a blocking arrangement in accordance with the present invention;

FIG. 5 is a top plan view of the manipulator of FIG. 1a; and

FIG. 6 is a diagrammatic view of a manipulator with different pairs of elements being blocked from displacement.

DESCRIPTION OF THE PREFERRED EMBODIMENTS

Figure 1A:
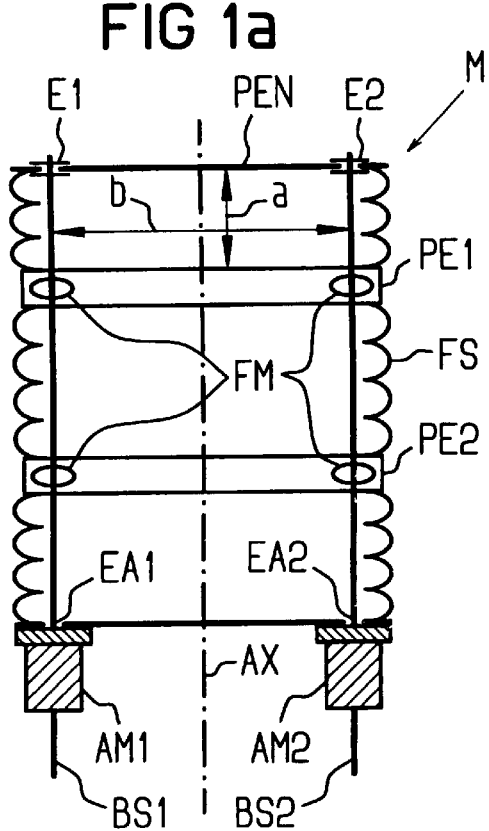
FIGS. 1a, 1b and 1c are diagrammatic cross sectional views illustrating the principles of the manipulator of the present invention, with FIG. 1a showing the manipulator in an unbent or unstressed position.
Figure 1B:
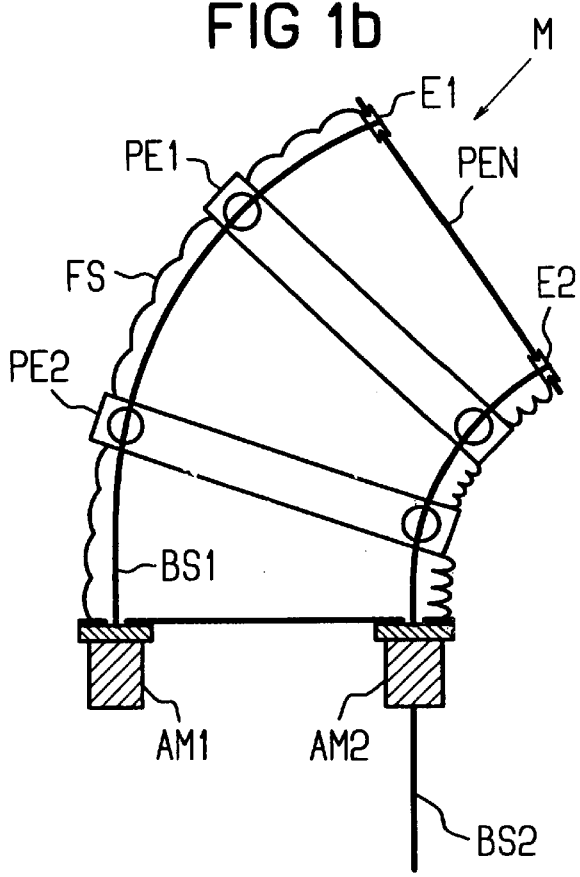
Figure 1C:
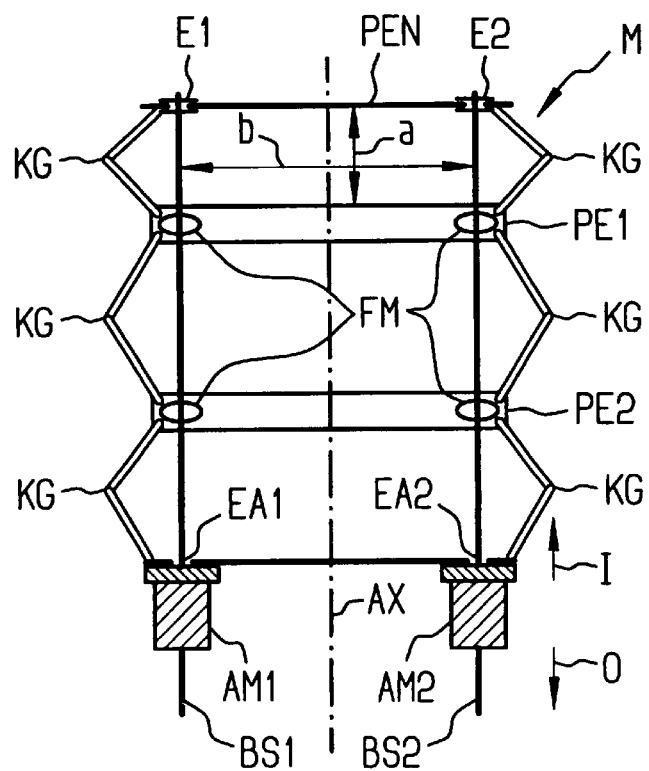

The principles of the present invention are particularly useful when incorporated in a manipulator, generally indicated at M in FIGS. 1a and 1b. The manipulator has a plurality of individual planar elements PE2, PE1 to PEN. Guide means FM for the actuating rods BS1 to BS2 are provided in each of the individual planar elements. These guide means ensure a frictionless axial displaceability of the actuating rods and, at the same time, a horizontal guiding of the individual planar elements. As can be further seen from FIG. 1a, the individual planar elements are stacked one over the other along a stacking axis AX. In order to produce a connection between the planar elements that is torsionally rigid, yet axially elastic, for example an expansion bellows tube or several correspondingly arranged toggle linkages are used, and FIG. 1a shows an example with the expansion bellow tubes FS forming the connecting means. FIG. 1c shows toggle linkages KG forming the connection means.

In order to be able to place the inventive manipulator in motion, the individual actuating rods BS1 and BS2 are rotationally mounted on the planar element PEN, and are received in axially immovable fashion by end bearings E1 and E2. As is easily seen from FIG. 1a, arbitrarily many such planar elements can be provided for the manipulator and the number of actuating rods can also be varied. The simplest construction that enables a high flexible mobility of the actuator consists in the arrangement of three actuating rods BS1–BS3 (see FIG. 5) in a relatively uniform spacing on the circumference of the respective planar elements. It can also be easily seen that the individual planar elements do not have to comprise identical shapes in order to be able to be actuated according to the invention. The individual case of application may require that differently formed planar elements be provided in such a manipulator. For example, this is the case when the manipulator is to be attached in the middle. The shape of the individual planar elements of this sort can, for example, be made rotationally symmetrical or also asymmetrical with a polygonal shape. In order to achieve a defined fixedness of the manipulator, together with a certain flexibility, it must be decided for the individual case of application which conditions are to be fulfilled. The relation of the spacing between the individual planar elements by a distance a to their maximal planar construction b is thereby decisive for the fixedness of the manipulator.

As can be further seen, drive means AM1 and AM2 are provided at the exit ends EA1 and EA2 of the respective actuating rods BS1 and BS2. For the motion of the actuating rods, arbitrary drive means may be provided, however, the drive of the individual actuating rods is preferably realized in that an external thread is provided on the respective actuating rods BS1 and BS2 and that an internal threading is contained in a respective drive means AM1 and AM2, which is mounted in an axial immovable fashion and thereby, through rotation in a corresponding direction of rotation, either displaces the actuating rod into the manipulator in a direction of arrow I of FIG. 1a or retracts it from the manipulator in the direction of arrow O of FIG. 1a. For example, this external threading on the respective actuating rods can be received by an internal thread made in a hollow shaft of the drive motor, for example the drive means AM1. By means of this arrangement, it is advantageously achieved that a few components are required for the construction.

To achieve the curved state illustrated in FIG. 1b, the actuating rod BS2 was drawn out of the manipulator M while the actuating rod BS1 remains in its position or was displaced into the manipulator M. The details of the procedure used to control the motion of the manipulator depends on its dimensions. It is immediately evident that through parallel actuation of the two actuating rods BS1 and BS2 in this case, a more rapid motion of the manipulator can be achieved than with the motion of just one actuating rod. It can be seen clearly from FIG. 1b that the guide means in the planar elements PE2, PE1 and PEN associated with the rod BS2 are drawn closer to one another, while the guide means for the same elements are uniformly spaced farther apart for the actuating rod BS1. As will be explained later, the individual guide means can comprise sheaths as projections with which they are connected fixedly but so as to be axially displaceable in the direction of the rod and which sleeves extend into one another telescopically along the actuating rod. In this way, it is inventively achieved that, given locking of these respective sheaths against one another, the spacing between individual planar elements no longer need come out in a uniform fashion, but rather can be set in a defined manner by purpose use of the individual locking means. In other words, with the locking means, it is possible to maintain the distance between the element PE1 and PEN so that all of the displacement occurs between the element PE1 and PE2 by the selective actuation of the locking or blocking means. For example, in FIG. 6, locking means LM1 on the rod BS1 was actuated while locking means LM2 and LM3 were released and locking means LM4 on the rod BS2 was released while locking means LM5 and LM6 were actuated. Thus, along the rod BS1, the distance between the element pair PEN and PE1 did not change while the distance between element pair PE1 and PE2 and pair PE2 and PE3 did change and along the rod BS2, the distance between element pair PE1 and PE2 and pair PE2 and PE3 remained constant, but changed at element pair PEN and PE1. This caused the displacement in FIG. 6.

As illustrated in FIGS. 2a and 2b, the planar elements PE1 and PE2, which are adjacent, have a first projection EAN and a second projection ZAN, which are formed in tubular fashion and extend into one another telescopically. It is particularly advantageous to attach these planar projections on the guide means, since blocking or locking means can then be actuated by the actuating rod BS. However, there can also be other cases in which it appears advantageous to do without an actuation of the locking means by an actuating rod. In such cases, these tubular projections can also be provided at other points of the adjacent planar elements PE1 and PE2.

In principle and in the inventive arrangement for the blockage of two adjacent elements along a direction of motion of an actuating rod, it is important that in this way, by a blocking or locking or, respectively, releasing mutually adjacent elements along their actuating rods and by means of a mutual exertion of pressure and tension on the respective actuating rods, the manipulator can be set to practically any shape, such as shown in FIG. 6. It is thereby also particularly advantageous that while individual planar elements are locked by means of the second actuating means, preferably provided on the actuating rod BS, at the same time, the axial displacement of the actuating rod is still enabled. Care must, therefore, be taken only that during the locking of the first and second locking means EBLM and ZBLM, an axial displaceability of the actuating rod is nonetheless enabled. This fact is, for example, realized as shown in FIG. 2b.

The second actuating means for the locking means EBLM and ZBLM are, for example, milled into the actuating rod BS in the form of longitudinal extending grooves. For each blocking or locking device to be actuated, consisting preferably of two blocking means EBLM and ZBLM, a longitudinal groove is provided on the actuating rod BS. This groove serves as a second actuating means ZBM. FIG. 2b shows the case in which the currently provided blocking means EBLM is released by the groove. This is achieved in that one of the longitudinal grooves in the actuating rod, which groove serves as a second actuating means ZBM, is deeper than the other grooves, such as ZBM1. It is thus ensured that in a respective rotational position for the rod BS, which position, for example, can be discretely changed, the respective second actuating means ZBM acts on the first actuating means EBM. For all the discrete rotational positions other than the one shown in FIG. 2b, this means that the first actuating means EBM is actuated by the second actuating means ZBM, and the first blocking means EBLM and the second locking means ZBLM are thus brought into contact with each other. At the same time, regarded axially, given another element pairing of planar elements, the first blocking means and the second blocking means provided there can be released, in that this actuating means for the corresponding planar element pair located there is provided in a different rotational position than the one shown in FIG. 2b. For example, in FIG. 6, three locking means LM1–LM3 are shown for the rod BS1. Thus, the rotational position of the rod will provide different combinations of actuated locking means, which include eight combinations (all locked, all release, LM1 locked with LM2 and LM3 released, LM1 and LM2 locked with LM3 released, LM1 and LM3 locked with LM2 released, etc.).

In the arrangement of FIG. 3, the first blocking means can be realized by providing a tongue T formed in the second projection ZAN and the outer surface of this tongue has a series of transverse cross-grooves CG, which coact with internal cross-grooves IG forming the interior of the first projection EAN, which is shown in chain lines in FIG. 3. The tongue T has an internal nipple or projection N, which preferably has a curvature and serves as the first actuating means EBM. Through rotation of the actuating rod BS, which is preferably fashioned so as to be rotationally rigid, the nipple N is brought into contact by means of the curvature provided therein so that the cross-grooves IG of the first projection EAN will be engaged with the cross-grooves CG of the tongue T. A particularly simple realization of such a cross-groove consists of the internal threads IG cut into the first projection. The embodiment shown here is only an example and is thereby entirely inconsequential for the functioning of the invention if other engaged locking means known from the prior art are used which will block the axial displacement of the first projection EAN and the second projection ZAN.

In particular, simpler solutions based on friction are also possible. For example, one of the projections, such as ZAN, can be made of a relatively rigid rubber, which presses only against the other and thereby satisfactorily blocks the two planar elements PE1 and PE2 from movement relative to each other through the friction of the projections EAN and ZAN. The blocking solution to be chosen depends on the individual case of applications and the force appearing there. In addition, the longitudinal grooves in the actuating rods have the advantage that the angle of rotation of the actuating rod is made discrete by means of these axial grooves, thus making it possible reliably to avoid, by means of this gridding, a possible torsion of the actuating rod and angle errors that occur thereby during the actuation of the different blocking or locking devices.

As mentioned above, FIG. 3 shows a perspective view of the first and second projections EAN and ZAN, as well as the first blocking means EBLM and the associated actuating means EBM. As a second actuating means ZBM, a longitudinal groove is, for example, provided here in the actuating rod BS, which is shown with only one groove in FIG. 3. If the actuating rod is rotated, the first actuating means EBM then moves, for example, into a higher groove ZBM1, which is shown to be adjacent the groove ZBM in FIG. 2b, which means that it is pressed against the inner wall of the first projection EAN and a pressure seat occurs between the two projections EAN and ZAN. In individual cases, the friction that occurs in this way can be sufficient to ensure a sufficiently high blocking or locking force. Moreover, for higher forces, cross-grooves or bores or the like can also be provided, in which the first locking means EBLM engages in order to produce a secure positive connection between the first projection EAN and the second projection ZAN, as illustrated in FIG. 3.

Figure 4:
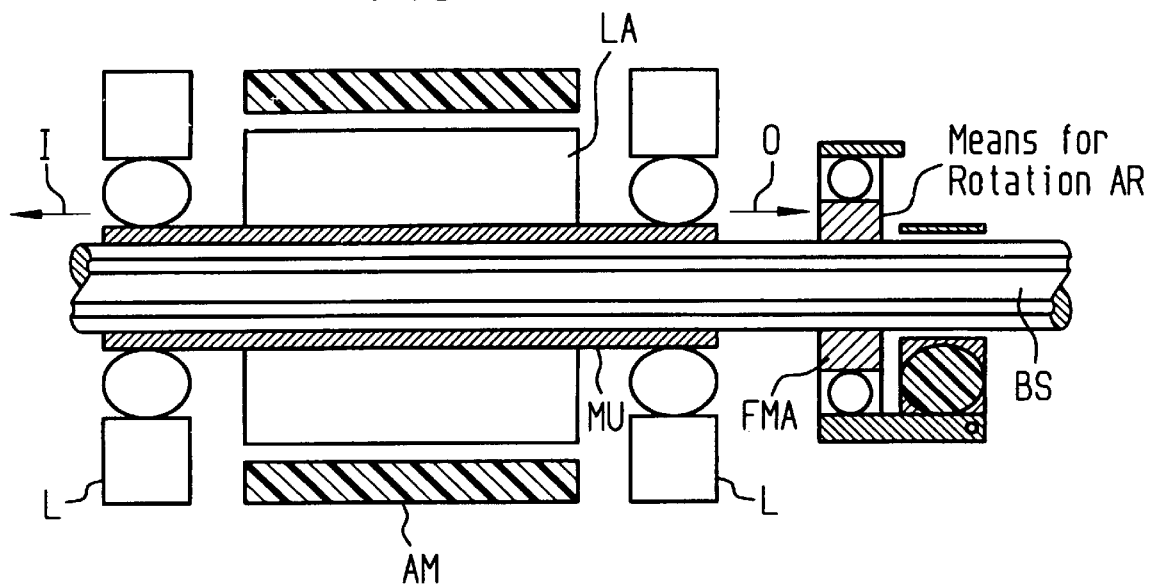
FIG. 4 is a longitudinal cross sectional view with portions in elevation for purposes of illustration of a drive for the actuating rod and axial guide means.

A drive mechanism for the actuating rod BS is shown in FIG. 4 and can be provided for each of the actuating rods. In this case, the actuating rod BS comprises an outer or external thread that is threaded into an internal thread of a sleeve MU. This sleeve MU is, for example, constructed as a hollow shaft of a drive motor and the sleeve is mounted on both sides of the exit of the motor by means of bearings L. By means of a suitable control, the rotor LA of the motor is transferred to the other direction of rotation and screws or threads the actuating rod BS. Since the drive means AM are fixedly mounted, the displaceable actuating rod BS is shifted in the direction of arrow I or in the opposite direction of the arrow O. Through a guide or control means FMA, it is ensured that the actuating rod BS cannot rotate during the displacement process. In the form of describing the actuating rod up to now, the control or actuating means FMA can, for example, serve for the axial guidance of the actuating rod. For the guiding thereof, a disk cut into a star shape is, for example, a possibility, which disk engages in the grooves and thus allows an axial displacement and no radial rotation of the rod. In order to be able to actuate the individual actuating means for the actuation of the locking means, it can be provided to mount the axial guide or control means FMA so as to be rotatable, but axially immovable, in order thereby to be able to set discrete positions of the angle of rotation for the actuating rod. For the predetermination of such a discrete position of the angle of the rotation, means AR are provided and sufficient possibilities are known from the prior art. For example, a clinch or ratchet mechanism can be provided that works by means of a sawtoothed wheel and a magnet for the means AR. In addition, means can also be provided that couple the rotor of the motor as a drive means AM for a short time with the axial guide or control means FMA, in order to create the rotation of the shaft or rod BS.

Concerning the shape of the manipulator, it can be said that the expansion bellow tubes appear to be a suitable elastic connecting means between two adjacent planar elements. However, it can also be useful, depending on the case, to provide toggle joints in order to ensure a high stability against rotation.

In relation to the sensorization of the position of the claimed manipulator, the inventive arrangement offers the advantageous possibility of measuring the placement of the elements to one another through an arrangement of a type of potentiometer. The grooves of the rods are thus lined with a conductive material with a high resistance value, and each planar element has sliders which are, for example, attached in position at the beginning and at the end of each segment. Two adjacent planar elements are thereby designated a segment. These sliders are preferably connected with a circuit via a line, which circuit can determine the resistance between the sliders and, thus, determine the set length of the spacing between the two planar elements. If, for example, the position of the sliders from segment to segment are rotated against one another, and if now one of the grooves, preferably the deeper one, is provided with a resistance material so that the position of the released segment can be measured, then the wipers can be switched parallel to one another for all segments along the actuating rod, and the wiring outlay can thus be minimized. If, for example, the distance from one segment to the second end EA2 of the actuator is measured, then one slider per segment is sufficient and all of the sliders can be connected to a single supply line.

The inventive construction with the actuator rod and projection points on the guide means is elastic and can be so dimensioned that a further structure can be done without. Hyper-redundant manipulators can thereby, for example, be constructed. If, for example, instead of three actuating rods for a flexible manipulator, six of these are used, and these actuating rods are attached in an arrangement such as illustrated in FIG. 3, then the degree of rotational freedom (torsion for the overall manipulator in itself) can be controlled, as well as the translational degree of freedom of the manipulator.

Although various minor modifications may be suggested by those versed in the art, it should be understood that we wish to embody within the scope of the patent granted hereon all such modifications as reasonably and properly come within the scope of our contribution to the art.

We claim:

1. A flexible manipulator comprising at least three planar elements having essentially the same shape being arranged one over the other along a stacking axis extending essentially perpendicular to a flat plane of each element so as to form a stacked arrangement, connecting means being provided between the elements, which respectively connect adjacent elements with one another and which essentially allow only an axial mobility of the elements along the stacking axis away from one another and toward one another as well as an angled position of the elements to one another, guide means uniformly distributed on the circumference of each of the elements and providing at least three sets on first axes extending parallel to the stacking axis, which sets have essentially the same spacing from one another, each set of guide means including tubular projections made of an elastic material which are arranged and constructed so that respectively a first projection of a first element of a pair of adjacent elements extends telescopically into a second projection of a second element of the pair to provide a positive connection of the pair of adjacent elements, which connection provides axial displacement between the adjacent elements, a flexible elastic actuating rod being provided for each of the sets of guide means, each rod being fastened in an axial non-displaceable manner to a first end of the stack arrangement and extending through an exit at the second end of the stack arrangement in a highly displaceable manner, and separate drive means for each of the actuating rods for engaging the respective rod at the second end of the stack arrangement and for displacing the rod to change the distance between the planar elements.

2. A flexible manipulator according to claim 1, wherein the connecting means comprises toggle linkages extending between adjacent planar elements.

3. A flexible manipulator according to claim 1, wherein the connecting means is an expansion bellows tube.

4. A flexible manipulator according to claim 1, in which the first projection of a first element comprises at least one locking means for blockage of the axial displacement which work together with its respective second projection.

5. A flexible actuator according to claim 1, in which the first and second projections of the first and second elements comprise at least one first and one second locking means for blockage of the axial displacement which work together with one another.

6. A flexible manipulator according to claim 5, wherein the first locking means comprises first actuating means for actuating the first locking means.

7. A flexible manipulator according to claim 6, wherein at least one actuating rod comprises second actuating means and the first actuating means works together with the second actuating means of the actuating rod in such a way that it locks and unlocks the first locking means through rotation of the actuating rod.

8. A flexible manipulator according to claim 6, wherein a second actuating means is provided on the actuating rod at least for each element pairing present on the manipulator, wherein the second actuating means are constructed so that, respectively, one second actuating means in a discrete rotational position of the actuating rod releases exactly one first locking means of exactly one element pairing and blocks it in the other discrete rotational positions so that at least one other first locking means of a second element pairing is released.

9. A flexible manipulator according to claim 1, wherein the drive means includes at least one actuating rod having external threads in the vicinity of the second end being threadedly received in internal threads of a hollow sleeve, said sleeve being mounted for rotation without axial displacement so that the at least one actuating rod is moved due to rotation of said sleeve.

10. A flexible manipulator according to claim 9, wherein control means are provided to allow an axial displaceability of the actuating rod and to provide a definite setting of a rotational position of the rod.

11. A flexible manipulator according to claim 10, in which the sleeve is a hollow shaft of a drive motor.

12. A flexible manipulator according to claim 10, in which means are provided for driving the control means in order to enable an automatic setting of a definite rotational position of the actuating rod.

13. A flexible manipulator according to claim 9, wherein the sleeve is a hollow shaft of a drive motor.

14. A flexible manipulator comprising at least two planar elements having essentially the same shape being arranged one over the other along a stacking axis extending essentially perpendicular to a flat plane of each element so as to form a stacked arrangement, connecting means being provided between the elements, which respectively connect the at least two elements with one another and which essentially allow only an axial mobility of the elements along the stacking axis away from one another and toward one another as well as an angled position of the elements to one another, guide means uniformly distributed on the circumference of each of the elements and providing at least three sets on first axes extending parallel to the stacking axis, which sets have essentially the same spacing from one another, each set of guide means including tubular projections made of elastic material which are arranged and constructed so that respectively a first projection of one of the at least two elements extends telescopically into a second projection of the other of the at least two elements to form a connection of the two elements which connection provides axial displacement, a flexible elastic actuating rod being provided for each of the sets of guide means, each rod being fastened in an axial non-displaceable manner to a first end of the stack arrangement and extending through an exit at the second end of the stack arrangement in a highly displaceable manner, and separate drive means for each of the actuating rods for engaging the respective rod at the second end of the stack arrangement and for displacing the rod to change the distance between the planar elements.

15. A flexible manipulator according to claim 14, in which the first projection comprises at least one locking means for blockage of the axial displacement which work together with the second projection.

16. A flexible actuator according to claim 14, wherein the first and second projections comprise at least one first and one second locking means for blockage of the axial displacement which work together with one another.

17. A flexible manipulator according to claim 16, wherein the first locking means comprises a first actuating means that serves for actuating the locking means.

18. A flexible manipulator according to claim 17, wherein at least one actuating rod comprises second actuating means and the first actuating means works together with the second actuating means of the actuating rod in such a way that it locks and unlocks the first locking means through rotation of the actuating rod.

* * * * *